United States Patent
Cagnoni

(10) Patent No.: US 9,884,776 B2
(45) Date of Patent: Feb. 6, 2018

(54) METHOD FOR TREATING DRINKING WATER BY MEANS OF A REPLACEABLE CARTRIDGE FILTERING SYSTEM

(75) Inventor: Serena Cagnoni, Mestrino (IT)

(73) Assignee: STRUTTURA S.R.L., Vicentino (VI) (IT)

( * ) Notice: Subject to any disclaimer, the term of this patent is extended or adjusted under 35 U.S.C. 154(b) by 271 days.

(21) Appl. No.: 14/111,765

(22) PCT Filed: Apr. 16, 2012

(86) PCT No.: PCT/IB2012/051884
§ 371 (c)(1),
(2), (4) Date: Oct. 14, 2013

(87) PCT Pub. No.: WO2012/107916
PCT Pub. Date: Aug. 16, 2012

(65) Prior Publication Data
US 2014/0034579 A1    Feb. 6, 2014

(30) Foreign Application Priority Data

Apr. 15, 2011  (IT) ............................... PD2011A0128

(51) Int. Cl.
*C02F 1/42* (2006.01)
*C02F 1/00* (2006.01)
(Continued)

(52) U.S. Cl.
CPC ................ *C02F 1/42* (2013.01); *C02F 1/003* (2013.01); *C02F 1/283* (2013.01); *C02F 1/505* (2013.01);
(Continued)

(58) Field of Classification Search
CPC .......... B01J 47/04; B01J 47/145; C02F 1/003; C02F 1/42; C02F 2001/422;
(Continued)

(56) References Cited

U.S. PATENT DOCUMENTS

| | | | | |
|---|---|---|---|---|
| 2003/0196962 A1* | 10/2003 | Fries | ......................... | C02F 1/42 210/681 |
| 2005/0181931 A1* | 8/2005 | Mouri | .................... | B01J 20/186 502/60 |
| 2010/0068343 A1* | 3/2010 | Johann | .................... | C02F 1/003 426/66 |

FOREIGN PATENT DOCUMENTS

| EP | 0406674 A1 | 1/1991 |
|---|---|---|
| EP | 2130799 A1 | 12/2009 |

(Continued)

OTHER PUBLICATIONS

English language translation of EP 2,263,503 A2 to Schotz et al, Jun. 2010 [retrieved on May 6, 2016] Retrieved from the Espacenet patent search data base using internet <URL: http://worldwide.espacenet.com>, 15 pages.*

(Continued)

*Primary Examiner* — Matthew O Savage
(74) *Attorney, Agent, or Firm* — Kristina Castellano; Castellano PLLC

(57) ABSTRACT

A method for treating drinking water by modifying the ion concentration in the filtered water by means of a replaceable cartridge filtering system comprises: —defining a plurality of types of water to be filtered on the basis of chemical and physical features of the water to be treated; —defining a plurality of classes of filtered water to be obtained with the filtering system on the basis of chemical and physical features of the filtered water; —providing a plurality of filter cartridges containing a filtering material based on a mixture of two or more ion exchange resins, the mixture being formed from predetermined proportions of the two or more resins, each cartridge of the plurality of cartridges having a different mixture of the two or more resins and being capable of retaining ions from, and/or releasing ions into, the water filtered in the filtration process; —correlating one or more of (Continued)

the classes of filtered water with each cartridge of the plurality of cartridges for each type of water to be filtered;
—selecting a cartridge from the plurality of cartridges in order to obtain a desired class of filtered water on the basis of a specified type of water to be filtered.

10 Claims, 1 Drawing Sheet

(51) Int. Cl.
    *C02F 1/28*     (2006.01)
    *C02F 1/50*     (2006.01)
    *C02F 1/68*     (2006.01)
    *C02F 101/20*     (2006.01)
    *C02F 101/30*     (2006.01)

(52) U.S. Cl.
    CPC .......... *C02F 1/68* (2013.01); *C02F 2001/427* (2013.01); *C02F 2101/20* (2013.01); *C02F 2101/306* (2013.01); *C02F 2201/006* (2013.01); *C02F 2307/04* (2013.01)

(58) Field of Classification Search
    CPC .......... C02F 2001/425; C02F 2001/427; C02F 2201/006; C02F 2307/04; C02F 2101/20
    See application file for complete search history.

(56) References Cited

FOREIGN PATENT DOCUMENTS

| | | |
|---|---|---|
| EP | 2263503 A2 | 12/2010 |
| WO | 2010115477 A1 | 10/2010 |

OTHER PUBLICATIONS

ISR and Written Opinion in PCT/IB2012/051884 dated Jun. 15, 2012.

* cited by examiner

METHOD FOR TREATING DRINKING WATER BY MEANS OF A REPLACEABLE CARTRIDGE FILTERING SYSTEM

CROSS REFERENCE TO RELATED APPLICATIONS

This application is a U.S. National Stage Application of PCT/IB2012/051884 filed on Apr. 16, 2012, which claims priority to Italian patent application PD2011A000128 filed on Apr. 15, 2011, the contents of both of which are incorporated herein by reference.

TECHNICAL FIELD

The invention relates to a method for treating drinking water by means of a replaceable cartridge filtering system for modifying the ion concentration in the filtered water by using filter cartridges containing ion exchange filtering material, comprising the features mentioned in the preamble of the principal claims.

PRIOR ART

Treatment methods which use ion exchange filter cartridges to modify the ion concentration in the filtered water are widely used for the treatment of drinking water for domestic use.

Filter cartridges can comprise ion exchange resins which are generally composed of a polymer matrix to which ions are bound, these ions being available for ion exchange with the water passing through the cartridges. These resins can contain ions capable of correcting the water hardness and reducing the content of any heavy metals in the water.

These resins may include acid groups (cation exchange resins) or basic groups (anion exchange resins). The acid groups of the first type of resin can be strongly acidic sulphonic groups ($—SO_3H$) (called strongly acidic resins) or carboxyl groups ($—COOH$) being weakly acidic (called weakly acidic resins).

There are known methods of using ion exchange resins to adjust the hardness of drinking water and reduce the concentration of heavy metals in the water, in which the metal ions are exchanged, in most cases, with the hydrogen ions of the ion exchange resins.

However, an excess of hydrogen ions in the water is inadvisable, since it reduces the pH of the water excessively, thereby making it acidic, whereas water for human consumption preferably has a pH of $\geq 6.8$.

Furthermore, although these resins efficiently remove the heavy metals, they excessively impoverish the filtered water in certain mineral salts which it contains and which are necessary, at specific concentrations, for human health.

Furthermore, the known exchange resins cannot always yield the same results, in the form of filtered water having constant chemical and physical features, because the chemical and physical features of the filtered water change in response to variations in the chemical and physical features of the water to be treated.

Consequently there is a risk that, depending on the water to be treated, the filtered water that is obtained may have excessively low levels of certain mineral salts, or, conversely, may have a high content of undesired substances, such as heavy metals or ions which lower the pH excessively.

GB2020266 describes a system for treating water for aquariums with the aim of reducing the concentration of heavy metals and using ion exchange resins to recreate artificially the chemical and physical composition of water in natural environments such as fresh water, sea water, and the like, which are suitable for various species of fish.

However, the adjustment which can be achieved with the system described in GB2020266 is rather approximate.

The adjustment of the chemical and physical features in an aquarium in which the system according to GB2020266 is provided takes place slowly and progressively: the water in the aquarium is recycled and made to flow many times through the cartridges according to GB2020266 in an attempt to improve the chemical composition of the water with each successive pass.

Additionally, the adjustment that can be made by the system according to GB2020266 does not take into account the chemical and physical features of the water to be treated, in other words the water which is supplied to the aquarium, but only takes into account the final features to be obtained.

For some types of water, therefore, there is a risk that insufficient or inadequate adjustment will be made, even after successive passes of the water to be treated through the filtering system.

Furthermore, although the adjustment that can be obtained with the system according to GB2020266 can be considered acceptable for an aquarium or similar environment, it cannot be considered acceptable for other applications in which more precise adjustment is required.

More specifically, the adjustment that can be obtained with the system according to GB2020266 cannot be achieved in applications in which treated water having desired chemical and physical features has to be produced by means of a single pass of the water to be treated through the cartridge containing the resins, as is usually the case in filter systems for human consumption.

U.S. Pat. No. 5,238,576 discloses multi-layer cartridges for selectively decreasing the content of nitrites and nitrates in water to be treated.

However, this system also eliminates excessive amounts of certain mineral salts from the water, even though the presence of salts in the water is desirable, and therefore cannot be used to adjust the content of different types of ion in the water to be treated.

DESCRIPTION OF THE INVENTION

The technical problem on which the present invention is based is that of providing a method for treating drinking water for human consumption by modifying the ion concentration in the filtered water, by means of which filtered water with a decreased content of heavy metals and with a desired content of mineral salts can be obtained.

A further object of the present invention is to provide a method for treating drinking water for human consumption which can be used to obtain filtered water having desired chemical and physical features regardless of the chemical and physical features of the water to be treated.

In particular, one object of the invention is to provide a method for treating drinking water for human consumption which can be used to obtain a high degree of removal of heavy metals from the water to be treated, and, in the course of the same stage of removal, to modify the concentration of calcium and magnesium salts in order to obtain filtered water having a specified concentration of these salts.

A particular object of the invention is to provide a method for treating drinking water which can be used to obtain filtered water having a lower concentration of certain ions and a higher concentration of other ions, such as calcium and/or magnesium, by comparison with the water to be treated. A further object is to provide a method which can be used to obtain satisfactory removal of heavy metals, such as copper, lead, aluminium and mercury, from the water to be treated, and to remove some semi-metals, while adjusting, in the same stage of removal, the content of one or more desired mineral salts, for example calcium, magnesium, potassium, sodium, fluorine or manganese salts, in order to obtain filtered water having predetermined chemical and physical features.

In particular, according to the invention, the adjustment of the content of mineral salts such as calcium, magnesium, potassium, sodium, fluorine and manganese can include the addition of one or more of these mineral salts to the filtered water by comparison with the amounts present in the water to be treated, in such a way that the concentration of one or more of the aforementioned salts in the filtered water is greater than their concentration in the water to be treated.

Thus it is possible to obtain filtered water that has a lower content of heavy metals, or undesired mineral salts, while also having a higher content of certain desired mineral salts, such that the water is suitable for particular purposes and/or is particularly suitable for use by particular users.

A further object is to provide a filtering system which can be used to obtain filtered water which has a substantially neutral or basic pH, or which is close to a neutral condition, for example with a pH in the range from 6.5 to 8.5.

According to the invention, a method is provided for treating drinking water by modifying the ion concentration in the filtered water by means of a replaceable cartridge filtering system, the method comprising: defining a plurality of types of water to be filtered on the basis of chemical and physical features of these types; defining a plurality of classes of filtered water to be obtained by means of the filtering system on the basis of chemical and physical features of the filtered water; providing a plurality of filter cartridges containing a filtering material based on a mixture of two or more ion exchange resins, the mixture being formed by predetermined percentages of two or more resins, each cartridge of the plurality of cartridges having a different mixture of the two or more resins and being capable of retaining ions from, and/or releasing ions into, the filtered water; correlating each cartridge of the plurality of cartridges for each type of water to be filtered with one or more of the classes of filtered water, and selecting a cartridge from the plurality of cartridges in order to obtain a desired class of filtered water from a specified type of water to be filtered.

The method according to the invention can be used to obtain filtered water having desired chemical and physical features, starting with water to be treated which has widely variable ion concentrations.

It is also possible to select the appropriate cartridge for obtaining filtered water having desired chemical and physical features, according to the chemical and physical features of the water to be treated.

The classes of the plurality of classes of filtered water to be obtained with the filtering system can have concentrations of certain ions which are lower than the concentrations of these ions in the water to be treated and concentrations of other ions which are greater than the concentrations of these ions in the water to be treated.

In other words, the method according to the invention can be used to obtain filtered water having, by comparison with the water to be treated, a reduced concentration of certain ions, for example heavy metals, and an increased concentration of other ions, for example calcium, magnesium, potassium, manganese, sodium, or a mixture of these.

Thus it is possible to obtain filtered water for human consumption which has an extremely low content of undesired substances, such as heavy metals, but which is not excessively impoverished in mineral salts required for human health, or which is enriched with certain mineral salts if required. In the following text, the term "chemical and physical features" of the water to be filtered and/or the filtered water denotes the hardness, the pH, the concentration of certain mineral salts, and the content of heavy metals.

Preferably, the filter cartridge which is used is of the percolating type through which the water to be treated flows, and which can exchange ions with the water flowing through it; in other words, it can retain ions from, and/or release them into, the filtered water.

In other versions, the cartridge can contain mechanical filtering means such as an inlet grid and an outlet grid, or filtering mesh, in order to filter, respectively, the water to be treated entering the cartridge and the filtered water leaving it, before and after the percolation.

BRIEF DESCRIPTION OF THE DRAWINGS

The features and advantages of the invention will be made clearer by the following detailed description of a preferred, but non-exclusive, example of embodiment thereof, illustrated, for the purposes of guidance and in a non-limiting way, with reference to the attached drawings, in which.

PREFERRED EMBODIMENT OF THE INVENTION

Figure 1:
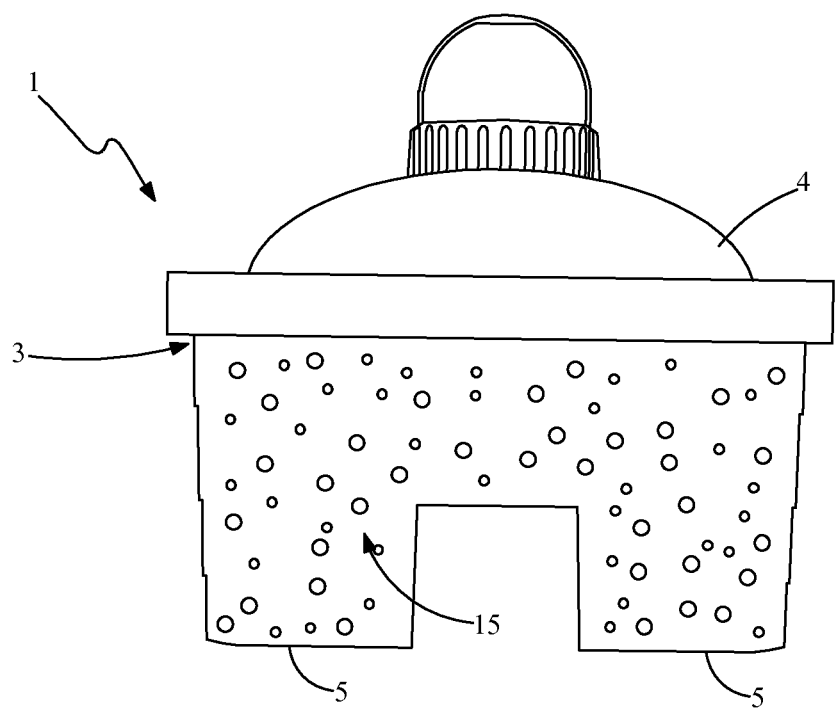
FIG. 1 is a schematic and partially sectional view of a filter cartridge having an ion exchange material made according to the present invention.
Figure 2:
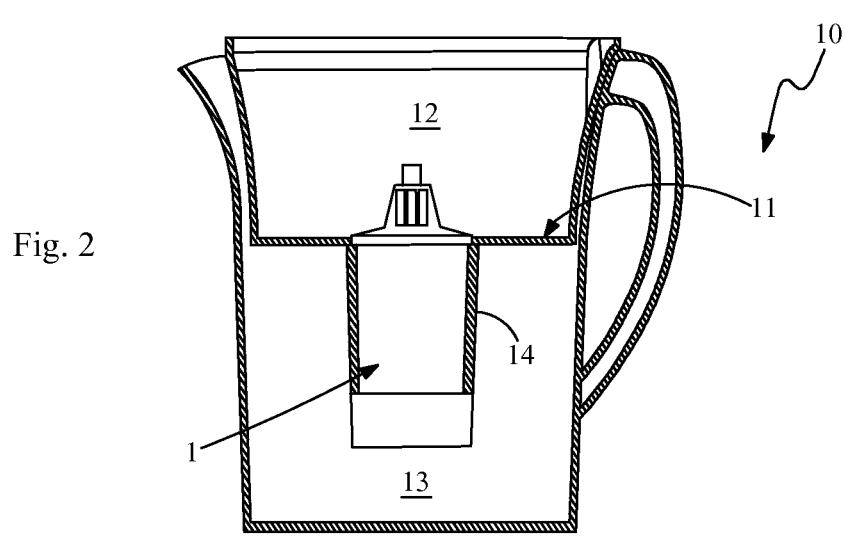
FIG. 2 is a schematic and partially sectional view of a filter jug including the cartridge of FIG. 1.

In the drawings, the number 1 indicates the whole of a replaceable filter cartridge for percolation filtering devices such as filter jugs, infusers, cafetières and the like. Typically, a device of this kind, such as a jug 10, shown in FIG. 2, includes a separator, or hopper 11, which divides the jug 10 into an upper container 12, for holding the water to be filtered, and a lower container 13, for collecting the filtered water. The hopper 11 has a seat 14 into which the cartridge 1 is fitted, usually in a sealed way, in such a manner that the whole flow of water to be filtered passes through the cartridge. The water to be filtered is poured into the upper container 12 and flows by gravity through the cartridge 1, after which it is collected in the lower container 13.

The cartridge 1 comprises an outer casing 3 having at least one inlet opening 4 positioned, in use, on the side facing the upper container 12, for the inflow of the water to be filtered, and at least one outlet opening 5 positioned, in use, on the side facing the lower container 13 for the outflow of the filtered water from the cartridge 1.

A grid or filtering mesh or other mechanical filtering device can be provided at the inlet opening 4 or at the outlet opening 5.

Inside the outer casing 3 there is provided an ion exchange filtering material 15 made according to the invention and positioned so as to exchange ions with the water during the passage of the latter through the material 15, in such a way that some ions are retained, thereby partially or completely reducing the concentration of undesired elements present in the water to be treated, typically heavy metals or semimetals such as arsenic and the like, and releasing ions such as calcium, magnesium, potassium, sodium, fluorine and manganese ions and the like into the filtered water, so as to provide filtered water having a low content of heavy metals and having a desired content of mineral salts, which, if desired, can be greater than the content of these salts in the water to be treated.

The ion exchange material 15 used in the cartridge according to the invention is preferably granular and comprises a mixture of two or more separate ion exchange resins, each of which is capable of exchanging one or more different ions with the water to be treated. The term "ion exchange" signifies that the ion exchange material is capable of retaining some ions present in the water to be treated and releasing other ions, if required, into the filtered water.

By varying the type, proportion and number of resins present in the ion exchange material 15, it is possible to obtain different mixtures of resins, which are then used to produce different filter cartridges. The different mixtures can be used to produce filtered water having desired chemical and physical features according to the various chemical and physical features of the water to be treated. The particular mixture for the ion exchange material of a specific cartridge is selected according to the chemical and physical features of the water to be treated, in other words the hardness, the content of heavy metals, and the like, and according to the chemical and physical features which it is desirable to obtain in the treated water, in other words the percentage content of various mineral salts, the hardness, the pH, and the like.

The ion exchange material can comprise a mixture of weakly and/or strongly basic resins and/or weakly and/or strongly acidic resins, and the acidic and basic mixtures can be mixed in the same mixture.

In one embodiment of the invention, the ion exchange material 15 comprises a mixture of an ion exchange resin loaded with calcium ions and an ion exchange resin loaded with magnesium ions in a desired percentage.

The relative percentages of the two resins are selected according to the features of the water to be treated and of the filtered water which is to be obtained. These percentages are preferably in the range from 30% to 70%.

In this embodiment it is possible to balance the calcium and magnesium salts by following the RDA (Recommended Daily Allowance) guidelines for each of the salts and/or by varying their relative proportions according to particular requirements for the concentration of the two salts.

By suitably varying the percentages of the ion exchange resins in the cartridge, it is possible to increase the concentration of calcium and/or magnesium salts, or the concentration of other desired mineral salts such as potassium, manganese and sodium, if required, thus producing a filtered water which is suitable for particular uses.

In another version, the mixture of the ion exchange material 15 further comprises a carboxyl resin loaded with hydrogen ions, for releasing hydrogen ions into the filtered water. The carboxyl resin is present in the ion exchange material in a percentage preferably in the range from 5 to 40%.

This embodiment is particularly suitable for adjusting the pH of the filtered water with respect to the pH of the water to be treated, in order to prevent the pH of the filtered water from being too basic, and/or if it is desired to have a filtered water with a more acid pH than the pH of the water to be treated.

In another version, the mixture further comprises a resin loaded with potassium and/or sodium and/or fluorine and/or manganese ions or other nutrients if required, in a desired relative proportion, in such a way that the resulting cartridge is capable of releasing one or more of the aforementioned ions into the filtered water, in a percentage depending on the percentage of the corresponding resin present in the mixture.

Various desired ions can be introduced into the filtered water by appropriately varying the mixture of resins in the ion exchange material, and the quantity of the various ions released into the filtered water can be varied by varying the relative proportions of the various resins in the mixture.

Thus it is possible to obtain filtered water which has a reduced content of heavy metals and is suitable for daily consumption, or water which has a desired content of certain mineral salts to meet the requirements of specific users, by selecting the resin(s) in the mixture in the filter cartridge.

For example, water enriched with certain salts can be produced, for patients requiring an increased intake of these salts because of specific physiological factors, and/or for the purpose of recovery from exertions in sport, or for specific pathological conditions.

For example, it is possible to produce mixtures which release more calcium, for lactating or pregnant women, or elderly people, or patients deficient in this element; or to produce mixtures which release more magnesium and/or potassium, and which are particularly useful for athletes, by increasing the percentages of the respective resins in the mixtures.

It is also possible to obtain water with a particularly low content of certain salts for patients who require a low intake of these salts because of specific physiological conditions and/or specific pathological conditions.

Preferably, the cartridge 1 also contains a vegetable carbon impregnated with silver, for example a carbon obtained from coconut shells which is impregnated with silver. The presence of the vegetable carbon makes it possible to absorb chlorine and its derivatives, for example chlorinated pesticides, trihalomethanes and other chlorine-containing compounds which may be present in the water to be treated.

Vegetable carbon is generally in granular form and is preferably mixed with the mixture of ion exchange resins in the cartridge. The action of the vegetable carbon does not affect the action of the mixture of resins, because the process of reduction of chlorine and its derivatives is different from the process by which the resin acts on hardness and heavy metals; the first of these processes takes place by absorption and the second process takes place by ion exchange. The presence of silver provides bacteriostatic activity.

In a first process for the production of the aforesaid cartridges, in order to obtain the various desired mixtures, it is provided for mixing at the time of assembly of the cartridge different ion exchange resins, each loaded with different acid groups, or resins for exchanging different ions with the filtered water.

Thus the percentages of the different ion exchange resins in the cartridge mixtures are controlled in a simple and highly precise way.

Alternatively, different ion exchange resins, in other words those capable of exchanging different ions to produce different mixtures of resins, can be pre-mixed, and one of the different prepared mixtures can be loaded into the cartridge subsequently at the time of assembly of the cartridge. Thus the preparation of the different cartridges is considerably simplified and accelerated. Thus, in both cases, cartridges with different mixtures are produced in a simple manner, these cartridges being capable of treating different types of water effectively in order to produce filtered water having different combinations of concentrations of salts.

According to the invention, a plurality of types of water to be filtered is defined on the basis of their chemical and physical features. In particular, the various types are defined according to the hardness of the water to be treated, expressed in French degrees, or its pH, or other variables.

The hardness of the water varies greatly with the geographical region, the aquifer from which the mains supply is taken, the condition of the water main, the type and size of the urban or rural centre, and other factors. Table 1 below shows the hardness in French degrees (° F.) for many Italian cities.

TABLE 1

| CITY | HARDNESS | CITY | HARDNESS |
|---|---|---|---|
| Cuneo | Very hard >35° F. | Frosinone | Hard 22-35° F. |
| Mantua | Very hard >35° F. | Livorno | Very hard >35° F. |
| Biella | Soft 0-7° F. | Arezzo | Very hard >35° F. |
| Forlì | Very hard >35° F. | Florence | Medium 7-15° F. |
| Lodi | Very hard >35° F. | Prato | Very hard >35° F. |
| Belluno | Medium 7-15° F. | Lucca | Very hard >35° F. |
| Bergamo | Hard or calcareous 22-35° F. | Pesaro | Very hard >35° F. |
| Genoa | Medium 7-15° F. | Siena | Very hard >35° F. |
| Aosta | Very hard >35° F. | Rome | Hard 22-35° F. |
| Bolzano | Medium 7-15° F. | Macerata | Very hard >35° F. |
| Ravenna | Medium hard 15-22° F. | Terni | Very hard >35° F. |
| Ferrara | Very hard >35° F. | Perugia | Medium 7-15° F. |
| Rimini | Medium 7-15° F. | Potenza | Hard 22-35° F. |
| Bologna | Very hard >35° F. | Crotone | Hard 22-35° F. |
| Alessandria | Very hard >35° F. | Avellino | Medium 7-15° F. |
| Reggio Emilia | Very hard >35° F. | Brindisi | Hard 22-35° F. |
| Brescia | Very hard >35° F. | Taranto | Soft 0-7° F. |
| Parma | Very hard >35° F. | Bari | Soft 0-7° F. |
| Piacenza | Very hard >35° F. | Salerno | Soft 0-7° F. |
| Chieti | Medium 7-15° F. | Cagliari | Very hard >35° F. |
| Grosseto | Very hard >35° F. | Foggia | Very hard >35° F. |
| Rieti | Medium 7-15° F. | Naples | Hard 22-35° F. |
| Campobasso | Medium 7-15° F. | Sassari | Hard 22-35° F. |
| Pescara | Hard 22-35° F. | Palermo | Very hard >35° F. |
| Pisa | Very hard >35° F. | Trapani | Very hard >35° F. |
| Ancona | Very hard >35° F. | Benevento | Very hard >35° F. |

As can be seen, five different types of water to be treated can be distinguished, in Italy at least, on the basis of hardness.

As stated above, the cartridges according to the invention can be used to adjust the content of mineral salts in the filtered water according to the RDA (recommended daily amount), for healthy consumers, and/or for consumers suffering from specific deficiencies of certain mineral salts due to pathological conditions, or for particular physiological conditions, for example pregnant or lactating women, children at various stages of growth, adolescents, athletes, elderly people, and so on, and/or for consumers who require a reduced, or increased, intake of certain mineral salts.

On the basis of the above considerations it is possible to define a plurality of classes of filtered water, for example according to the concentration of calcium, magnesium, potassium or manganese ions, or according to the total concentration of calcium and magnesium, or calcium and potassium, or potassium and magnesium ions, or any desired combination of these ions.

The RDA levels for various mineral salts vary with the age and with the physiological condition of individuals, for example pregnancy, lactation, participation in sports and the intensity thereof, and so on. The RDA levels for the most important mineral salts for various types of individual are published by the World Health Organization.

In particular, the recommended intake of Ca is three to four times greater than the recommended level for Mg, the Ca requirement increases for adolescents, adults over the age of 51, and during lactation, and the Mg requirement is higher for adolescents and adults below the age of 51, and during pregnancy.

This information is summarized in Table 2 below.

TABLE 2

| Age (years) | RDA for Ca (mg) | RDA for Mg (mg) |
|---|---|---|
| Newborn babies | 400 | 30-75 |
| Children (1-10) | 500-1300 | 80-240 |
| Adolescents (11-18 years) | 1000-1300 | 410 |
| Adults (19-51 years) | 700-1300 | 400 |
| Adults (≥51 years) | 1200 | 320 |
| Pregnancy | 700-1000 | 360 |
| Lactation | 1000-1200 | 320 |

Similar considerations are applicable to other mineral salts required for general human health and/or for other categories of user. For example, athletes have a greater requirement for potassium and magnesium; the potassium and magnesium requirement is greater in summer; lactating women need much smaller quantities of potassium and sodium than individual adults; the daily requirement for potassium increases during lactation; and so on.

Furthermore, in the presence of certain pathologies, such as cardiovascular diseases (CVDs) or those affecting the skeletal system, the daily requirement for calcium and magnesium differs from the level that would be appropriate for healthy users.

Consistent epidemiological studies have supported the hypothesis of an inverse correlation between the intake of magnesium and/or calcium dissolved in drinking water and the incidence of cardiovascular diseases which are among the main causes of mortality and morbidity in industrialized countries. The onset and development of cardiovascular pathologies are correlated with the interaction of a plurality of risk factors such as genetic features, metabolic factors and lifestyle, although these do not fully explain the variation in mortality rates found in different countries.

Studies conducted on a worldwide scale have demonstrated a significant incidence of CVD in populations supplied with water having a lower content of calcium and magnesium. Further research has confirmed the existence of a protective effect of calcium and magnesium dissolved in drinking water in relation to the onset of CVDs.

Furthermore, scientific studies suggest that water with an adequate concentration of mineral salts reduces the loss of mineral salts from food during cooking, thus further increasing the daily intake of mineral salts. Drinking water is a preferred source of mineral salts by comparison with food or other sources, as the absorption of salts from drinking water is better, while the assimilation of drinking water rich in mineral salts prevents any deficiency of mineral salts, due for example to an unbalanced diet.

An appropriate quantity of mineral salts in water facilitates the assimilation of other trace elements which are present in the water and required for health, while also enabling the absorption of any heavy metals in the water to be reduced and/or avoided.

According to the invention, a plurality of classes of filtered water can be defined on the basis of the above considerations, according to the chemical and physical features which it is desirable and/or possible to obtain in the water.

The various classes of filtered water differ from each other in respect of the different mineral salts present and also in respect of the different concentrations of the mineral salts.

When the aforesaid types of water to be treated and the aforesaid classes of filtered water have been defined, a plurality of filter cartridges is provided, containing different mixtures of two or more ion exchange resins, each mixture being formed of two or more ion exchange resins in predetermined percentages, so as to be capable of retaining ions from, or releasing ions into, the filtered water.

If necessary, the different cartridges can be identified by different forms of identification so as to be easily distinguishable, for example by means of differently coloured packaging or suitable symbols for recognition.

Each cartridge of the plurality of cartridges previously prepared for each type of water to be treated is then correlated with one or more of the classes of filtered water; that is to say, for each cartridge, and therefore for each mixture, given a certain type of water to be treated, the grade(s) of filtered water than can be obtained are defined, or, in other words, the chemical and physical features of the filtered water produced by each specific cartridge are defined.

The aforesaid correlations can be shown on a suitable graphic medium designed to be applied, for example, to the packaging of a filter cartridge, or of a filtering system, in order to assist the user in his choice of one or more cartridges, of the plurality of available cartridges, which will be suitable for the purpose, in other words for the type of water available to the user and/or the class of water to be obtained.

The graphic medium will also show the plurality of types of water to be treated and the plurality of classes of filtered water, defined as explained above, and will indicate a plurality of filter cartridges, each containing a filtering material based on a mixture of two or more ion exchange resins formed by predetermined percentages of these two or more resins, each cartridge of the plurality of cartridges having a different mixture of the two or more resins and being capable of retaining ions from, or releasing ions into, the filtered water. The graphic medium will also show a correlation, for each type of water to be filtered, between each cartridge of the plurality of cartridges and one or more of the classes of filtered water, in such a way that the user can select a suitable cartridge.

As has been stated, the specific chemical and physical features desired in the filtered water can be adjusted by varying the relative proportions, the type and the number of ion exchange resins in the mixtures of ion exchange material in the various cartridges.

In the case of the "salt concentration" parameter, equal to the total concentration of calcium and magnesium salts, of the water to be treated and filtered, this is composed of two factors x and y, where x=concentration of $CaCO_3$ in the water to be treated; y=concentration of $MgCO_3$ in the water to be treated; F=ion exchange material in the cartridge; $x_1$=concentration of $Ca^{2+}$ ions released by the ion exchange material F into the filtered water; $y_1$=concentration of $Mg^{2+}$ ions released by the ion exchange material F into the filtered water; $z_1$=concentration of $H^+$ ions released by a normal unbuffered weak cationic resin into the filtered water.

Let us assume that we are using a cartridge whose mixture is formed by a resin loaded with calcium and one loaded with magnesium.

We shall consider by way of approximation that the total concentration of mineral salts in the water to be treated is the sum of the concentration of $CaCO_3$ and $MgCO_3$, or in other words x+y=100, where 1≤x≤100 and 1≤y≤100.

The relationship between the percentages of calcium and magnesium ions in the mixture is governed by the formula $$F=x_1+y_1 \qquad (a)$$

where $x_1+y_1=100$ and $1 \leq x_1 \leq 100$ $1 \leq y_1 \leq 100$.

In a second embodiment of the invention, in other words a cartridge in which the ion exchange material is produced by mixing an ion exchange resin loaded with calcium ions and an ion exchange resin loaded with magnesium in the cartridge, the relationship between the percentages of calcium and magnesium ions is governed by the following formula.

$$F=F_1(x_1)+F_2(y_1) \qquad (b)$$

In a third embodiment of the invention, in other words a cartridge comprising a mixture formed from a resin loaded with calcium ions, a resin loaded with magnesium ions, and a carboxyl resin loaded with hydrogen ions, the relationship between the percentages of the aforesaid ions is governed by the following formula:

$$F=x_1+y_1+z_1 \qquad (c)$$

in which $x_1+y_1=100-z_1$

In the embodiment of the invention in which the ion exchange material is produced by mixing an ion exchange resin loaded with calcium ions, a resin loaded with magnesium, and a resin loaded with hydrogen ions in the cartridge, the relationship between the percentages of the aforesaid ions is governed by the following formula.

$$F=F_1(x_1)+F_2(y_1)+F_3(z_1) \qquad (d)$$

Formulae similar to those shown above can be devised for the other possible compositions of the mixtures in the cartridges, with allowance for the concentration of other mineral salts, for example sodium, potassium, fluorine, manganese, and the like in the water to be treated and/or in the filtered water.

By using the corresponding formulae, and given the type of water to be treated, it is therefore possible to predict the features of the filtered water that can be obtained by means of the different cartridges, in other words by means of the different mixtures of ion exchange material. On the basis of these predictions, each cartridge and each type of water to be filtered is then correlated with one or more of the classes of filtered water.

Thus a user can select a specific cartridge from the plurality of cartridges, and can select the one most suitable for his purposes at different times, on the basis of the type of water available for treatment and the class of filtered water, in other words on the basis of the mineral salts whose presence is desired in the filtered water and the concentrations, or ranges of concentrations, to be obtained.

For a given type of water to be treated, the user will select a different cartridge from the plurality of available cartridges to obtain a different class of water, in other words water having a different content of certain mineral salts.

When the cartridges suitable for each type of water to be treated and for each class of filtered water have been produced, each cartridge is provided with an indication of the class or classes of filtered water that the cartridge can produce from the different types of water to be treated. Let us assume that the user has hard water with a hardness between 22 and 35° F. available to him, and desires to keep this value high and treat the water by means of a cartridge whose mixture comprises a resin loaded with calcium and magnesium ions, in other words a cartridge whose ion exchange material is described by formula (a), that is to say $F=x_1+y_1$.

In this case, in order to obtain the aforementioned results, it will be useful to select a mixture of resins in which $x_1=50$ and $y_1=50$, in other words to product cartridges in which the ion exchange material contains a mixture of approximately 50% resin loaded with calcium ions and approximately 50% resin loaded with magnesium ions.

It is possible to provide an indication in the cartridge that it is capable of producing hard water from hard water to be treated, while obviously removing undesired elements such as heavy metals or the like from the water.

If the water available to the user is very hard, at >35° F., and he wishes to adjust this hardness by using a mixture of a calcium resin, a magnesium resin and a carboxyl resin, described by formula (c), that is $F=x_1+y_1+z_1$, where $x_1+y_1=100-z_1$, he will select mixtures whose percentages of the different resins are defined thus: $20 \leq x_1 \leq 30$, $20 \leq y_1 \leq 30$, $40 \leq z_1 \leq 60$.

The very high hardness of the water to be treated can be adjusted by a release of $H^+$ ions if necessary.

Similar considerations apply to other mineral salts, and therefore the user will receive information on which cartridge to select in order to obtain filtered water having a desired content of calcium and/or magnesium, and/or sodium, and/or potassium, and/or fluorine, and/or manganese, according to the available type of water to be treated.

The user can also select a different type of cartridge if he needs a different class of water because of specific physiological or pathological conditions, even though the available type of water to be treated is still the same.

Similar correlations can be established, as stated, for different types of water to be treated and for different classes of filtered water, in such a way that information can be provided, on the packaging of the cartridges or on a display stand holding filter cartridges for sale, about the class of water obtainable from different types of water to be treated, and it can be pointed out that different consumers can select the appropriate cartridges for their requirements.

The invention claimed is:

1. A method for treating drinking water by modifying the ion concentration in the filtered water by a replaceable cartridge filtering system, the method comprising:
   defining a plurality of types of water to be filtered on the basis of chemical and physical features of the water to be treated;
   defining plurality of classes of filtered water to be obtained with the filtering system on the basis of chemical and physical features of the filtered water, said classes of filtered water being selected according to the concentration of certain ions in the filtered water, said ions being selected from a group comprising calcium, magnesium, sodium, potassium, fluorine and manganese;
   providing a plurality of filter cartridges each containing a filtering material based on a mixture of two or more ion exchange resins, each said mixture being formed from predetermined proportions of said two or more ion exchange resins, each cartridge of said plurality of cartridges having a different mixture of said two or more ion exchange resins and being capable of retaining ions from the water to be filtered and releasing into the filtered water one or more of said ions selected from a group comprising calcium, magnesium, sodium, hydrogen, potassium, fluorine and manganese, and wherein at least one of said ion exchange resins of at least one of said plurality of filter cartridges is loaded with manganese and/or fluorine ions and is capable of retaining heavy metal ions in the water to be filtered and releasing manganese and/or fluorine ions into the water to be filtered;
   correlating one or more of classes of filtered water with each cartridge of said plurality of cartridges for each type of water to be filtered; and
   selecting a cartridge from said plurality of cartridges in order to obtain a desired class of filtered water on the basis of a specified type of water to be filtered.

2. The method according to claim 1, wherein said classes of filtered water are selected on the basis of the hardness and/or pH of the filtered water.

3. The method according to claim 1, wherein said classes of filtered water have a concentration of heavy metal ions, which is reduced below that of the water to be treated, and a concentration of other ions, selected from the group consisting of calcium, magnesium, potassium, manganese, or a combination thereof, which is increased above that of the water to be treated.

4. The method according to claim 1, wherein at least one of said types of water to be filtered is selected on a basis of a hardness and/or a pH of the water to be treated.

5. The method according to claim 1, wherein at least one of said types of water to be treated is selected on a basis of a heavy metal content of the water to be filtered.

6. The method according to claim 1, wherein the ion exchange resins of least one of said mixtures comprises two or more ion exchange resins selected from a group comprising ion exchange resins loaded with calcium, magnesium, hydrogen, sodium, potassium, fluorine, and manganese ions, in order to modify the content of calcium and/or magnesium and/or hydrogen and/or sodium and/or potassium and/or fluorine and/or manganese, respectively, in the filtered water.

7. The method according to claim 6, wherein the ion exchange resins of least one of said mixtures comprises a carboxyl ion exchange resin capable of releasing hydrogen ions into the filtered water in order to adjust the pH of the filtered water.

8. The method according to claim 6, wherein the ion exchange resins of least one of said mixtures further comprises an ion exchange resin loaded with sodium and/or potassium and/or fluorine and/or manganese, in order to modify the content of sodium and/or potassium and/or fluorine and/or manganese, respectively, in the filtered water.

9. The method according to claim 1, wherein at least one of said mixtures is selected so as to increase the concentration of calcium and/or magnesium and/or sodium and/or potassium and/or fluorine and/or manganese ions in the filtered water.

10. The method according to claim 1, wherein the ion exchange resins of least one of said mixtures comprises an ion exchange resin loaded with calcium and an ion exchange resin loaded with magnesium in relative proportions ranging from 30% to 70%, adapted to balance the content of calcium and magnesium ions in the filtered water.

* * * * *